United States Patent [19]
Takagi et al.

[11] Patent Number: 5,994,815
[45] Date of Patent: Nov. 30, 1999

[54] ROTARY ELECTRIC MACHINE HAVING COIL END EXTENDING RADIALLY OUTWARD AS COMMUTATOR

[75] Inventors: Yoshito Takagi, Toyohashi; Masami Niimi, Handa, both of Japan

[73] Assignee: Denso Corporation, Kariya, Japan

[21] Appl. No.: 09/123,437

[22] Filed: Jul. 28, 1998

[30] Foreign Application Priority Data

Dec. 8, 1997 [JP] Japan ..................... 9-337224
Apr. 17, 1998 [JP] Japan ..................... 10-108127

[51] Int. Cl.$^6$ .......................... H01R 39/06; H02K 13/04
[52] U.S. Cl. .......................... 310/237; 310/220; 310/233; 310/234; 310/235; 310/239; 310/245; 310/248
[58] Field of Search .................... 310/220, 233, 310/234, 235, 237, 239, 248, 245

[56] References Cited

U.S. PATENT DOCUMENTS

| | | |
|---|---|---|
| 5,508,577 | 4/1996 | Shiga et al. ............... 310/233 |
| 5,650,683 | 7/1997 | Shiga et al. ............... 310/233 |
| 5,698,914 | 12/1997 | Shiga et al. ............... 310/233 |

*Primary Examiner*—Elvin Enad
*Attorney, Agent, or Firm*—Pillsbury Madison & Sutro LLP

[57] ABSTRACT

An electric rotating machine has an armature coil comprising outer and inner coil trunks disposed in slots of an armature core as well as outer and inner coil arms disposed along an axial side surface of the armature core. The outer coil arms are arranged to operate as a commutator and in slidable contact with brushes. The diameters of the radially outermost parts of the outer coil arms and the brushes are larger than that of the radially outermost surface of the outer conductor. This arrangement assures a larger commutator-brush contact area that reduces current density as well as heat generation in the commutator-brush contact area. As the radially outwardly extending parts of the outer coil arms are exposed to the surrounding air, the outer coil trunk, the outer coil arm and the brushes as well as the radially outwardly extending part are cooled effectively during rotation of the armature core.

10 Claims, 3 Drawing Sheets

ROTARY ELECTRIC MACHINE HAVING COIL END EXTENDING RADIALLY OUTWARD AS COMMUTATOR

CROSS REFERENCE TO RELATED APPLICATION

This application relates to and incorporates herein by reference Japanese patent applications No. 9-337224 filed on Dec. 8, 1997 and 10-108127 filed on Apr. 17, 1998.

BACKGROUND OF THE INVENTION

1. Field of the Invention

The present invention relates to an electric rotating machine and, more particularly, to an electric rotating machine that can be used for a starter for cranking engines.

2. Related Art

A surface-commutator type electric rotating machine is proposed in U.S. Pat. No. 5,508,577 (JP-A7-231617). In this electric rotating machine, coil ends of an armature coil extend towards a rotary shaft of an armature in the radial direction along the axial side surfaces of an armature core so that the coil ends disposed at one axial side of the armature core are used as commutator surfaces of a commutator on which brushes slide. As the radially extending coil ends are used as the commutator, the axial length of the armature can be shortened and hence the size of the electric rotating machine can be reduced.

In manufacturing this type of electric rotating machines of different output power specifications, it is more advantageous to change the axial length of the armature than to change the radial length of the armature from the standpoint of using same component parts for the electric rotating machines and same manufacturing apparatus for manufacturing the electric rotating machine.

Provided that only the axial length of the armature is changed for a different output, the heat capacity of the armature will increase with increase in the axial length of the armature. Further, provided that the electric current supplied to the brushes is increased for higher output power, density of current in the brush-commutator sliding area increases correspondingly. As a result, the sliding of the brushes on the commutator surface increases heat generation, increasing the temperature of the entire part of the armature. This temperature rise tends to increase the electric resistance of the armature coil, causing lower output power than desired as well as shorter longevity of the brushes and the coil ends used as the commutator.

Therefore, it becomes necessary to enlarge the diameter of the armature to assure an increased brush-commutator sliding area. This will cause increase in the size of the armature in the radial direction and in the inertia mass of the armature. In the case where this electric rotating machine is used for a starter, for instance, the increased inertia mass of the armature will produce an increased collision shock when the starter engages with the ring gear of an engine.

Further, as the armature that uses the coil ends as the commutator has a shorter length in the axial direction of the armature core, it becomes difficult to dissipate the heat to the surrounding space. Thus, the heating of the armature coil must be reduced to maintain the electrical insulation of the armature coil. Particularly, when the conductors of the armature coil disposed in slots of the armature core expand in the axial direction because of heat expansion, the coil ends tend to move in the axial direction. Therefore, it becomes necessary to cool the armature coil for restricting the heat expansion.

SUMMARY OF THE INVENTION

It is therefore an object of the present invention to provide an electric rotating machine which has less heat generation in an armature coil.

It is another object of the present invention to provide an electric rotating machine which has an armature coil extended in the radial direction for an improved cooling without enlarging the size of an armature core.

According to the present invention, coil ends of an armature coil used as a commutator has radially outermost parts located radially outside of radially outermost parts of the armature coil disposed in slots of an armature core. Further, brushes are disposed to have its radially outermost part at radially outside of the radially outermost part of the armature coil disposed in the slots. Thus, the brush-commutator sliding area is increased to reduce the density of current in the sliding area and restrict heat generation in the sliding area.

That is, the coil ends of the armature core are enlarged in the radial direction to have more surface that is exposed to surrounding air. This will promote dissipation of heat, resulting in restriction of temperature rise in the armature coil and the brushes. Further, this will restrict curving of the coil ends or roughening of the commutator surface caused by the heat expansion of the armature coil as well as deterioration in electric insulation of the armature coil.

This coil end construction will also enable manufacturing of armatures of different output power by the use of the same manufacturing apparatus, while changing only the radial length or radial enlargement of the coil ends along with the brush-commutator sliding area.

BRIEF DESCRIPTION OF THE DRAWINGS

Other objects, features and advantages of the present invention will become more apparent from the following detailed description when read with reference to the accompanying drawings. In the drawings.

DETAILED DESCRIPTION OF THE PREFERRED EMBODIMENT

Figure 1:
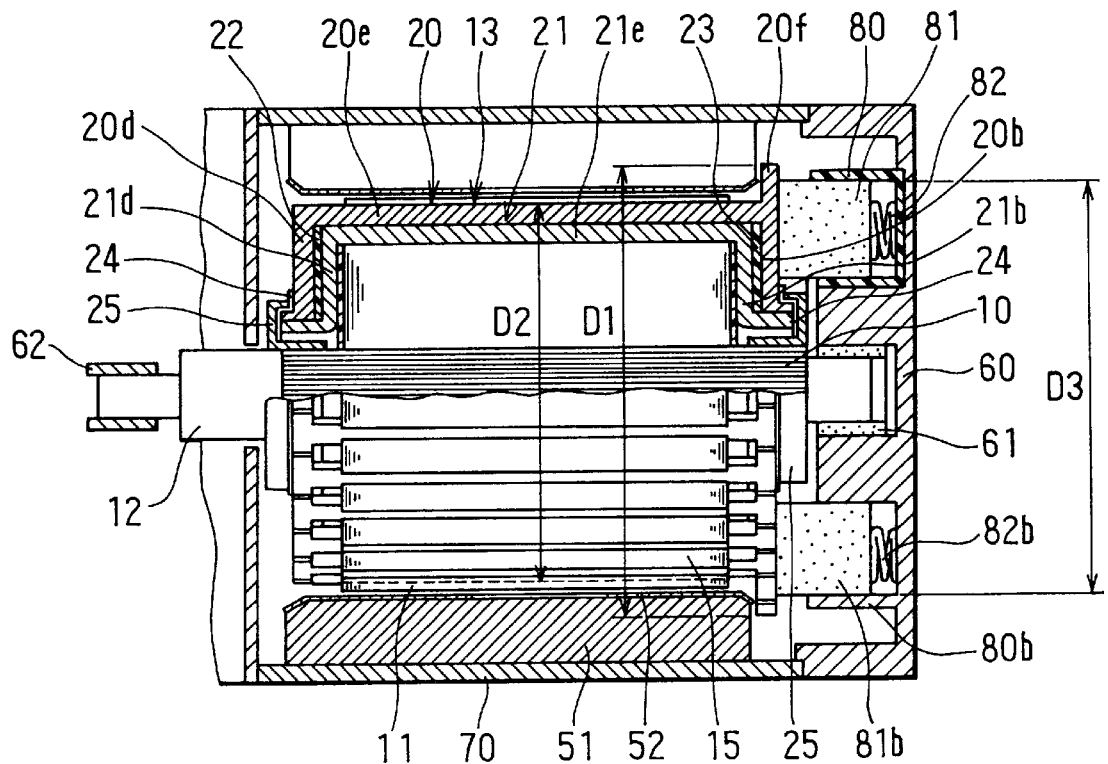
FIG. 1 is a sectional view showing an electric rotating machine according to a first embodiment of the invention.

The present invention will be described below with reference to embodiments shown in the drawings in which the same or similar reference numerals are used to designate the same or similar component parts.

Figure 2:
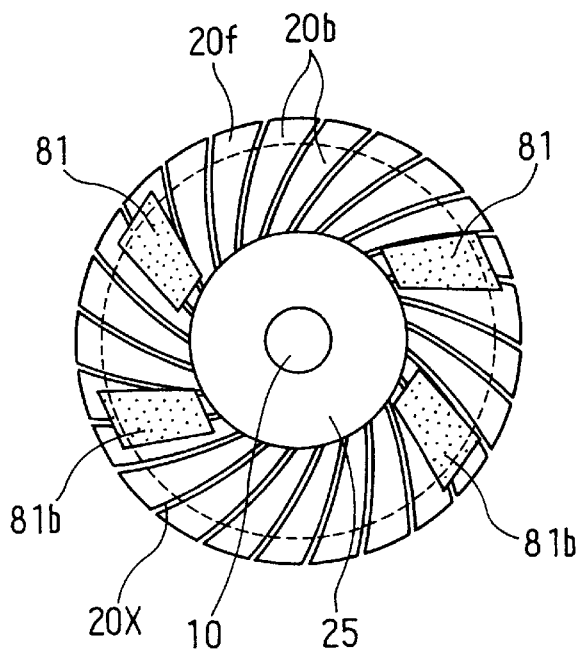
FIG. 2 is a plan view of coil ends used as a commutator in the embodiment shown in FIG. 1.

In FIGS. 1 and 2 which show an electric rotary machine according to a first embodiment, an armature core 11 formed by layering multiple disk-shaped steel plates is fit around a rotary shaft 10 at the axially approximate center of the rotary shaft 10. Multiple slots 13 extending axially are formed on the outer circumference of the armature core 11 to receive armature coils 21 therein. Each armature coil 21 has an outer armature coil part 20 that comprises an outer coil trunk 20e and outer coil arms 20b, 20d, and an inner armature coil part 21 that comprises an inner coil trunk 21e and inner coil arms 21b, 21d. In each slot 13, the outer coil trunk 20e and inner coil trunk 21e are fit in two layers.

The rotary shaft 10 is supported rotatably by a bearing 61 attached to an end frame 60 and a bearing 62 attached to another member (not shown). The end frame 60 is made of a metal and closes one axial end opening of a yoke 70 made of a cylindrical steel plate. A plurality of cylindrical or arcuate permanent magnet type field magnetic poles 51 are fixed to the inner circumferential surface of the yoke 70 by a cylindrical cover 52. Thus, the magnetic poles 51 face the outer circumferential surface of the armature core 11 with a small spacing therebetween.

The rotary shaft 10 has a gear 12 thereon that is engageable with gears of a speed reduction mechanism (for instance, planetary gear reduction mechanism) in case the electric rotating machine is used as a starter for an engine. Brush holders 80 each made of an electrically insulating material are fixed to the end frame 60, and high voltage-side brushes 81 are supported axially slidably in the brush holders 81. The end frame 60 has brush holding holes 80b at positions circumferentially spaced away a predetermined angular interval from the brush holders 80. Low voltage-side or ground-side brushes 81b are supported axially slidably in the brush holding holes 80b. Thus, the end frame 60 is used as a brush holding plate. The brushes 81 are pressed to outer coil arms 20b of the outer coil trunks 20e by springs 82 provided in the brush holders 80, while the brushes 81b are also pressed to the outer coil arms 20b by springs 82b provided in the brush holding holes 80b.

Each outer coil trunk 20e is integral with outer coil arms 20b, 20d that extend radially inwardly from both axial ends thereof, while each inner coil trunk 21 is integral with inner coil arms 21b, 21d that extend radially inwardly from both axial ends thereof. Each of integral pieces of the outer coil part 20 and the inner coil part 21 may be made of a conductive copper material. Radially inner ends of the outer coil arms 20b, 20d and inner coil arms 21b, 21d are extended as coil ends axially outward from axial end sides of the armature core 11. The radially inner end of the outer coil arm 20b is laser-welded to the radially inner end of the inner coil arm 21b, while the radially inner end of the outer coil arm 20d is laser-welded to the radially inner end of the inner coil arm 21d.

The outer coil arms 20b are arranged to operate also as a commutator on which the brushes 81, 81b contact slidably. Further, each outer coil arm 20b has an extension 20f extending radially outward from its radially outermost part beyond the radially outermost surface of the outer coil trunk 20e. The brushes 81, 81b are disposed to contact the extension 20f as well. A disk-shaped resin insulator 22 is interposed between the outer coil arm 20d and the inner coil arm 21d, while a disk-shaped resin insulator 23 is interposed between the outer coil arm 20b and the inner coil arm 21b. Similarly, disk-shaped resin insulators are interposed between the inner coil arms 21b, 21d and the axial end sides of the armature core 11.

As shown in FIG. 2, each outer coil arm 20b, 20d is curved in the clockwise direction as it extends radially outward. Although not shown in FIG. 2, each inner coil arm 21b, 21d is curved in the counter-clockwise direction as it extends radially outward. A constant width groove 20x is provided between the adjacent outer coil arms 20b to provide a passage for a centrifugal air flow generated radially outward when the armature core 11 rotates in the counter-clockwise direction. This air flow will cool the armature core 11, particularly the brushes 81, 81b and the commutator, thus restricting the temperature rise. In FIG. 2, the dotted line indicates the radially outermost surface of the armature core 11.

A collar 25 attached to the rotary shaft 10 is fitted on the axially extending ends of the outer coil arms 20b, 20d via a thin insulating member 24. This collar 25 will restrict the outer coil arms 20b, 20d and inner coil arms 21b, 21d from moving outward in the radial direction and axial direction due to the centrifugal force exerted thereon.

The above armature coil may be assembled in the manner disclosed in U.S. Pat. No. 5,508,577, incorporated herein by reference. Specifically, the outer coil arms 20b, 20d and inner coil arms 21b, 21d are joined to the outer coil trunk 20e and inner coil trunk 21e, respectively, by cold-forging, laser-welding, TIG-welding, brazing or other joining processes. In case that each slot 13 is an open slot type, the upper coil part 20 comprising the outer coil trunk 20e and the outer coil arms 20b, 20d may be formed by punching the copper plate and bending the same.

In the above embodiment, both the diameter D1 of the outermost end of the radial extension 20f of the outer coil arm 20b and the diameter D3 of the radially outermost part of the brushes 81, 81b are set larger than the diameter D2 of the outermost surface of the outer coil trunk 20e (outermost surface of the armature core 11). Thus, the sliding contact area of the brushes 81, 81b can be enlarged to lower the current density in the sliding contact area and restrict a temperature rise in the sliding contact area. Further, as the radial extension 20f is exposed in the surrounding space, it will be cooled by the surrounding air when the armature rotates. As a result, the outer coil arm 20b, outer coil trunk 20e and brushes 81, 81b will also be cooled correspondingly. Thus, accumulation of heat in the vicinity of the commutator-brush sliding area will be reduced to a minimum thus improving the longevity of brushes and commutator pieces. As the radial extension 20f can be made by simply enlarging radially the outer coil arm 20b, the armature coil can be manufactured easily and resistance against the centrifugal force can be improved.

Figure 3:
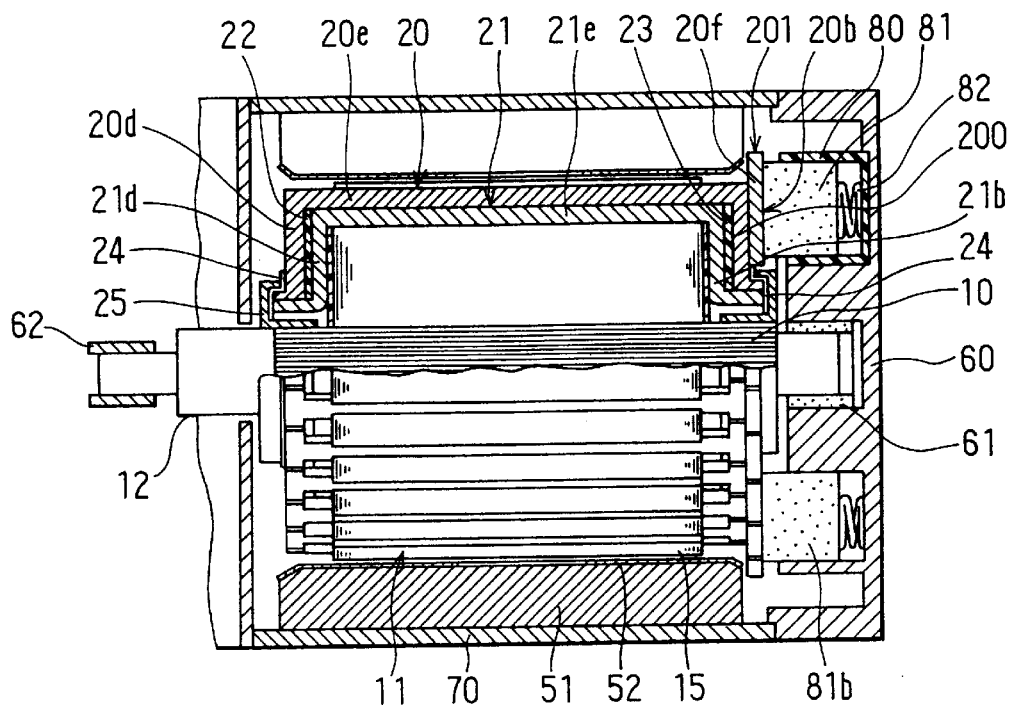
FIG. 3 is a sectional view showing an electric rotating machine according to a second embodiment of the invention.

In a second embodiment, as shown in FIG. 3, the outer coil arm 20b is constructed by two parts, axially inner part 200 and axially outer part 201 that are stacked on the insulator 23 in the axial direction. The inner part 200 extends integrally from the outer coil trunk 20e, and the outer part 201 are joined onto the axially outer surface of the inner part 200. The outer part 201 is extended radially outward from the radially outermost surface of the armature core 11 to provide the radial extension 20f.

This construction will simplify integral manufacturing of the outer coil trunk 20e and the outer part 201. Further, by addition of impurities in the outer part 201, the resistance of the radial extension 20f against wear may be improved to be higher than that of the inner part 200 and the outer coil trunk 20e that have a high electrical conductivity. Thus, the longevity of commutator pieces can be prolonged.

Figure 4:
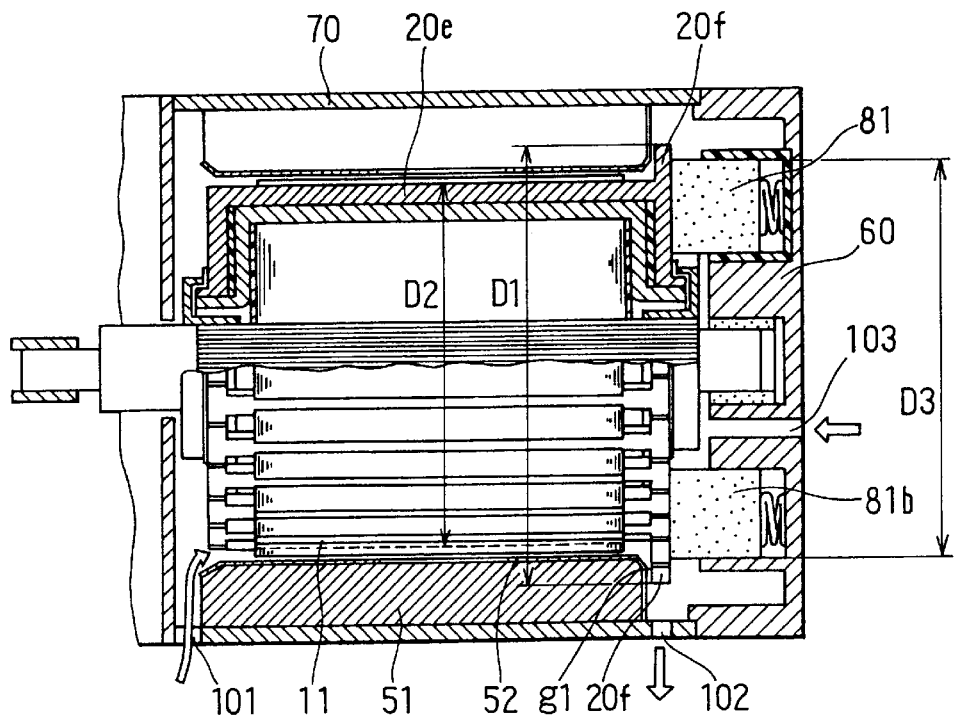
FIG. 4 is a sectional view showing an electric rotating machine according to a third embodiment of the invention.

In a third embodiment, as shown in FIG. 4, an air inlet hole 101 and air outlet hole 102 are provided in the yoke 70 near axial ends of the magnetic pole 51, and an air inlet hole 103 is provided in the end frame 60 as well. The air outlet hole 102 and air inlet hole 103 are provided closely to the commutator pieces and the brushes 81, 81b so that the commutator-brush sliding contact parts are cooled by fresh air and discharged. The radial extension 20f faces the axial end sides of cover 52 leaving a small gap g1 therebetween.

In this embodiment, when the radial extension 20f rotates at high speeds with the armature core 11, the centrifugal air flow is generated in the gap g1 and discharged through the air outlet hole 102. As the air is discharged from the outlet hole 102, fresh cool air is taken in through the air inlet hole 101 and passes axially through the space between the armature core 11 and the magnetic poles 51 and the space between the circumferentially adjacent two of the magnetic poles 51, thus cooling the outer coil trunks 20e.

Similarly, the centrifugal air flow generated by the grooves 20x between the outer coil arms 20b (commutator pieces) is also discharged through the air outlet hole 102. As this centrifugal air flow is discharged thus, fresh cool air flows in through the air inlet hole 103 to cool the brushes 81, 81b and the commutator-brush sliding contact area.

Figure 5:
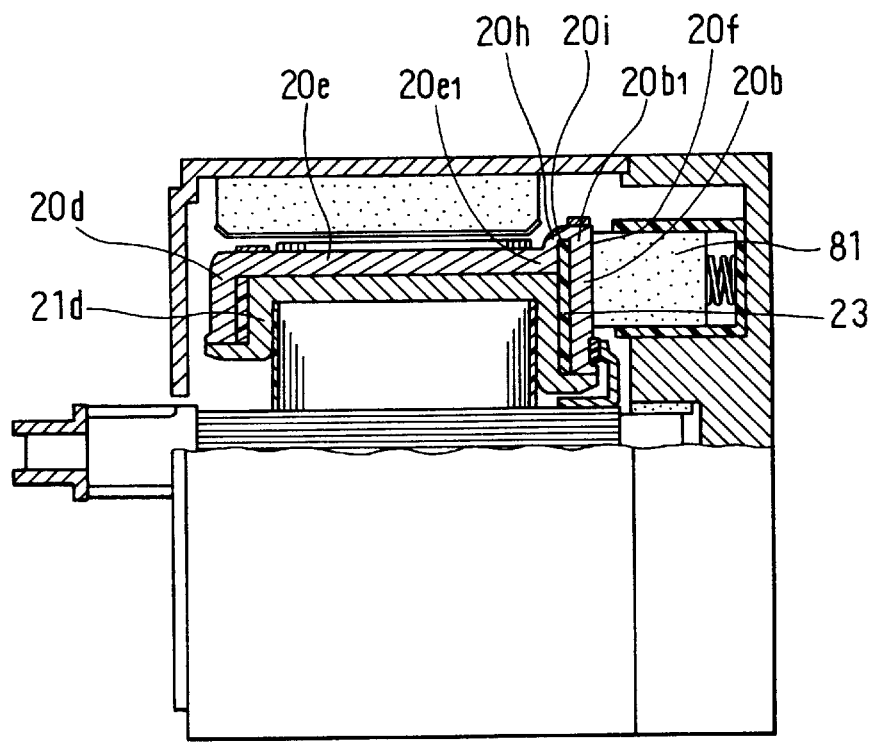
FIG. 5 is a sectional view showing an electric rotating machine according to a fourth embodiment of the invention.
Figure 6:
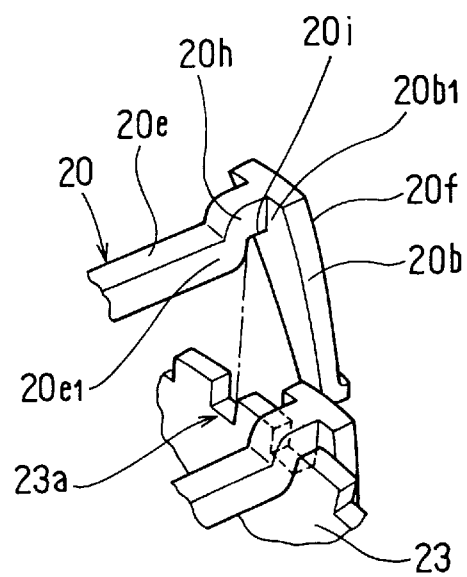
FIG. 6 is a perspective view showing coil ends of an armature core used in the fourth embodiment of the invention.

In a fourth embodiment shown in FIGS. 5 and 6, the outer coil trunk 20e of the outer coil part 20 is formed with a raised part 20h that extends from its one axial end 20e1 to one radial end 20b1 of the outer coil arm 20b. The raised part 20h is in a crank shape and extends radially outwardly from the outer coil trunk 20e to thereby provide the radial extension 20f that extends radially outward from the outermost surface of the upper outer coil trunk 20e. The raised part 20h is disposed axially outside of the axial side surface of the armature core 11.

The raised part 20h provides a recess 20i at the radial inside thereof. The resin insulator 23 interposed between the outer coil arm 20b and the inner coil arm 21b is preferably shaped to have recesses 23a on its outer circumference at a fixed angular interval so that the raised part 20h of each outer coil trunk 20e is received therein. The circumferential width of each recess 23a is generally the same as that of the raised part 20h thereby to restrict the movement of the outer coil part 20 in the circumferential direction.

The outer coil trunk 20e, raised part 20h and the outer coil arm 20b may be manufactured into a single piece by press-machining a conductive material. By fitting the raised part 20h into the corresponding recess 23a of the resin insulator 23 firmly, the outer coil arm 20b that operates as a commutator piece can be aligned onto the plane of the resin insulator 23. Therefor, the smoothness of the axially outer surfaces of the commutator pieces on which the brushes 81, 81b slide can be maintained even if the armature coil is subjected to heat expansion and contraction caused by changes in the temperature of the armature coil.

In the above embodiments, the outer coil arm 20d and inner coil arm 21d that extend radially inwardly at the axial end side of the armature core 11 may be eliminated so that the axial ends of the outer coil trunk 20e and corresponding inner coil trunk 21e may be joined together in the conventional manner.

Further, the outer coil arm 20d may also be provided with a radial extension thereby to improve cooling of the armature coil. Both of the outer coil arms 20b, 20d may be used as commutator pieces with respective brushes thereby to reduce heat generation. The outer coil arms 20d may be arranged to generate centrifugal air flow at the side opposite to the brushes instead of flowing the cooling air at the side of the outer coil arms 20d axially toward the outer coil arms 20b by using the centrifugal air flow generated at the side of outer coil arms 20b.

Still further, the above embodiments may be applied to other types of electric rotating machines such as a direct current motor using field coils for field magnetic poles and alternating current commutator motor.

We claim:

1. An electric rotating machine comprising:

an armature core having a plurality of slots on an outer circumference thereof;

a shaft fixed to the armature core for rotation;

an inner coil trunk and an outer coil trunk disposed in each slot;

an inner coil arm electrically connected to one end of the inner coil trunk at one end thereof and extending perpendicularly from the inner coil trunk toward the shaft along an axial end surface of the armature core;

an outer coil arm electrically connected to one end of the outer coil trunk and extending perpendicularly from the outer coil trunk toward the shaft along the axial end surface of the armature core, the outer coil arm being arranged axially outside of the inner coil arm and being connected to another end of the inner coil arm; and a brush disposed in slidable contact with an axially outer surface of the outer coil arm as a commutator surface to supply electric power to the outer coil trunk and the inner coil trunk, wherein a radially outermost end of the outer coil arm and a radially outermost end of the brush are located radially outside of a radially outermost surface of the outer coil trunk.

2. The electric rotating machine as is claim 1, further comprising:

a raised part integrally formed with the outer coil trunk and the outer coil arm and disposed between the outer coil trunk and the outer coil arm, the raised part being raised radially outward from the outer coil trunk.

3. The electric rotating machine as in claim 2, further comprising:

an insulator plate disposed between the outer coil arm and the inner coil arm and having an outer circumference fitted in a recess provided radially inside of the raised part.

4. The electric rotating machine as in claim 3, wherein:

the insulator plate has a recess on the outer circumference thereof to receive the raised part therein.

5. The electric rotating machine as in claim 1, further comprising:

a yoke; and a plurality of magnetic poles fixed to a radially inner circumference of the yoke to surround the armature core, wherein the outer coil arm has a radial extension extending radially outwardly from the outer coil trunk.

6. The electric rotating machine as in claim 5, wherein the radial extension has a radially outermost end facing axially an axial side surface of the magnetic poles.

7. The electric rotating machine as in claim 5, wherein the yoke has an air outlet hole at an axial position radially outside of the radial extension thereby to discharge centrifugal air flow generated by the armature core.

8. The electric rotating machine as in claim 5, further comprising a brush holding plate holding the brush therein movably in the axial direction of the armature core and having an air inlet hole at a position radially inside of the brush thereby to introduce air to the outer coil arm therethrough.

9. The electric rotating machine as in claim 8, wherein the yoke has an air inlet hole at an axial position near one axial side surface of the magnetic poles thereby to introduce air into the yoke; and the yoke has an air outlet hole at an axial position near another axial side surface of the magnetic poles and radially outside of the radial extension thereby to discharge therethrough the air introduced from the air inlet holes.

10. The electric rotating machine as in claim 9, wherein the radial extension has a radially outermost end facing axially the another axial side surface of the magnetic poles.

* * * * *